(12) United States Patent
Dufaure et al.

(10) Patent No.: US 12,362,407 B2
(45) Date of Patent: Jul. 15, 2025

(54) DEVICE FOR COOLING AND/OR HEATING AN ELECTRIC VEHICLE BATTERY

(71) Applicant: Arkema France, Colombes (FR)

(72) Inventors: Nicolas Dufaure, Serquigny (FR); Wissam Rached, Colombes (FR)

(73) Assignee: ARKEMA FRANCE, Puteaux (FR)

( * ) Notice: Subject to any disclaimer, the term of this patent is extended or adjusted under 35 U.S.C. 154(b) by 724 days.

(21) Appl. No.: 17/613,977

(22) PCT Filed: May 29, 2020

(86) PCT No.: PCT/FR2020/050924
§ 371 (c)(1),
(2) Date: Nov. 24, 2021

(87) PCT Pub. No.: WO2020/240143
PCT Pub. Date: Dec. 3, 2020

(65) Prior Publication Data
US 2022/0223935 A1    Jul. 14, 2022

(30) Foreign Application Priority Data

May 29, 2019   (FR) ...................................... 1905717

(51) Int. Cl.
*H01M 10/6567*    (2014.01)
*H01M 10/613*    (2014.01)
(Continued)

(52) U.S. Cl.
CPC ....... *H01M 10/613* (2015.04); *H01M 10/615* (2015.04); *H01M 10/625* (2015.04);
(Continued)

(58) Field of Classification Search
CPC ......... H01M 10/6567; H01M 10/6568; H01M 10/6556; H01M 10/613; H01M 10/615;
(Continued)

(56) References Cited

U.S. PATENT DOCUMENTS

| 2,705,227 A | 3/1955 | Stoeff |
| 4,230,838 A | 10/1980 | Foy et al. |
| | (Continued) | |

FOREIGN PATENT DOCUMENTS

| CN | 101298517 A | 11/2008 |
| CN | 102652372 A | 8/2012 |
| | (Continued) | |

OTHER PUBLICATIONS

French Search Report (Rapport de Recherche Préliminaire) dated Jan. 17, 2020 issued in corresponding French Patent Application No. FR1905717. (2 pages).

(Continued)

*Primary Examiner* — Jeremiah R Smith
(74) *Attorney, Agent, or Firm* — Boone IP Law

(57) ABSTRACT

A device for use in a circuit for cooling and/or heating a motor vehicle battery, including: an outer casing of a composition including: from 20% to 65% by weight of reinforcing fibers, which do not have thermal conduction properties, the balance being a matrix including at least one polyamide and an inner casing positioned facing the battery and intended to be in contact with a coolant of a composition including: from 5% to 65% by weight of reinforcing fibers, from 10% to 20% by weight of at least one thermally conductive component, when the reinforcing fibers used are not thermally conductive, at least one fire retardant, and the balance being a matrix including at least one polyamide chosen from semiaromatic polyamides and polyamides, a heat transfer fluid inlet; and a heat transfer fluid outlet, the device delimiting a battery cooling and/or heating volume.

16 Claims, 3 Drawing Sheets

(51) Int. Cl.
    *H01M 10/615*     (2014.01)
    *H01M 10/625*     (2014.01)
    *H01M 10/655*     (2014.01)
    *H01M 10/6556*     (2014.01)
    *H01M 10/6568*     (2014.01)
    *C08G 69/44*     (2006.01)

(52) U.S. Cl.
    CPC ..... *H01M 10/655* (2015.04); *H01M 10/6556* (2015.04); *H01M 10/6567* (2015.04); *H01M 10/6568* (2015.04); *C08G 69/44* (2013.01); *H01M 2220/20* (2013.01)

(58) Field of Classification Search
    CPC ............. H01M 10/653; H01M 10/625; H01M 2220/20
    See application file for complete search history.

(56) References Cited

U.S. PATENT DOCUMENTS

| | | | | |
|---|---|---|---|---|
| 5,460,900 | A * | 10/1995 | Rao | H01M 50/114 429/72 |
| 2003/0111776 | A1 | 6/2003 | Joachimi | |
| 2004/0265660 | A1 | 12/2004 | Reuschel | |
| 2008/0274355 | A1 * | 11/2008 | Hewel | C08J 3/12 524/495 |
| 2011/0183177 | A1 * | 7/2011 | Sohn | H01M 10/425 429/120 |
| 2013/0004808 | A1 * | 1/2013 | Tschismar | H01M 10/613 429/82 |
| 2013/0017422 | A1 * | 1/2013 | Bae | H01M 50/209 429/82 |
| 2014/0235770 | A1 | 8/2014 | Yu et al. | |
| 2014/0287292 | A1 * | 9/2014 | Baumgart | H01M 10/653 165/104.11 |
| 2019/0393569 | A1 * | 12/2019 | Rich | H01M 10/6562 |
| 2020/0243820 | A1 | 7/2020 | Rached et al. | |
| 2020/0303792 | A1 * | 9/2020 | Rheaume | H01M 10/625 |
| 2020/0365958 | A1 | 11/2020 | Rached et al. | |
| 2021/0108841 | A1 * | 4/2021 | Sugimura | B60H 1/00878 |

FOREIGN PATENT DOCUMENTS

| | | |
|---|---|---|
| CN | 103827188 A | 5/2014 |
| CN | 208862131 U | 5/2019 |
| EP | 0342066 A1 | 11/1989 |
| FR | 2273021 A1 | 12/1975 |
| JP | H0624238 A | 2/1994 |
| JP | 2005539094 A | 12/2005 |
| JP | 3170131 U | 9/2011 |
| JP | 2013513909 A | 4/2013 |
| JP | 2016035378 A | 3/2016 |
| WO | 2019068599 A1 | 4/2019 |
| WO | 2019101716 A1 | 5/2019 |

OTHER PUBLICATIONS

French Written Opinion on Patentability of the Invention (Opinion Écrite Sur La Brevetabilité de L'invention) dated May 29, 2019 issued in corresponding French Patent Application No. FR1905717. (5 pages).

International Search Report (PCT/ISA/210) with English translation and Written Opinion (PCT/ISA/237) mailed on Oct. 13, 2020, by the European Patent Office as the International Searching Authority for International Application No. PCT/FR2020/050924. (14 pages).

Official Action in corresponding Chinese Application No. 202080039305.7, mailed Dec. 5, 2023, with English Translation, 22 pages.

Office Action (the First Office Action) issued on Feb. 16, 2023, by the China National Intellectual Property Administration in corresponding Chinese Patent Application No. 202080039305.7 and an English Translation of the Office Action. (15 pages).

Office Action with English translation mailed on Jul. 30, 2024, by the Japan Patent Office (JPO) for Japanese Application No. 2021-570147, 8 pages.

Third Office Action issued by the China National Intellectual Property Administration for Application No. 202080039305.7 dated Feb. 25, 2025 with English translation, 11 pages.

\* cited by examiner

[Fig. 1]
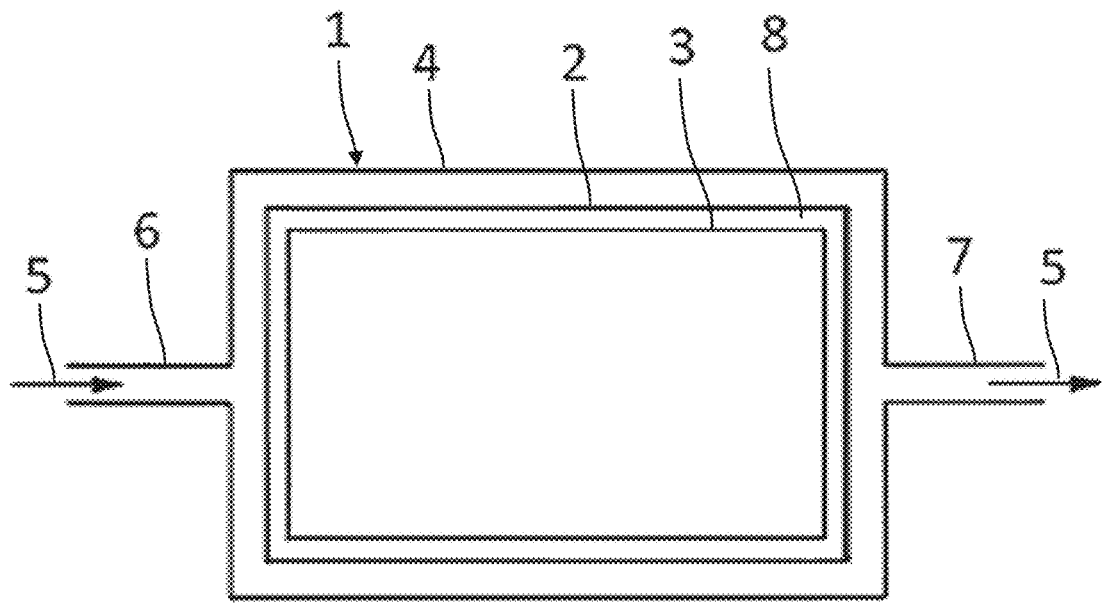
[Fig. 2]
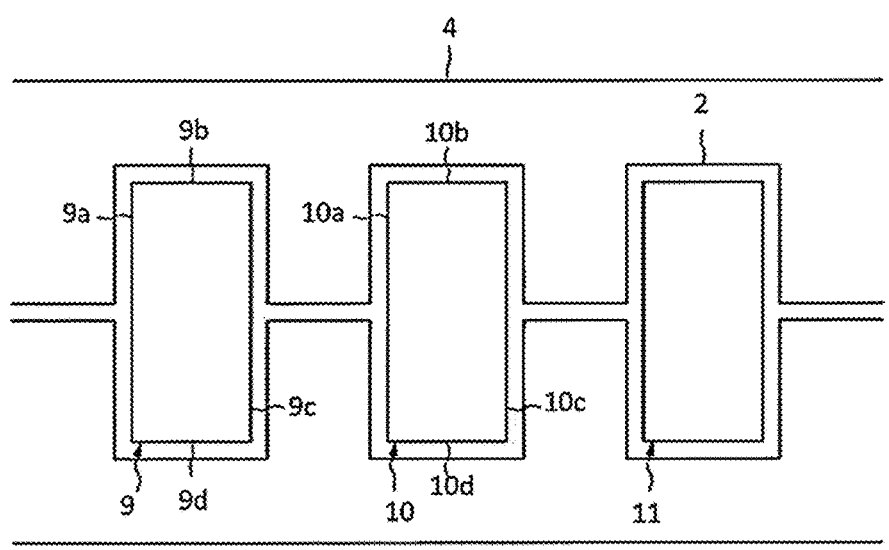

DEVICE FOR COOLING AND/OR HEATING AN ELECTRIC VEHICLE BATTERY

FIELD OF THE INVENTION

The present invention relates generally to the field of electric or hybrid type motor vehicles requiring the use of electric batteries.

More precisely, the invention relates to a cooling and/or heating device for a battery for an electric or hybrid motor vehicle.

STATE-OF-THE-ART

One of the goals sought in the automotive field is to propose less and less polluting vehicles. Thus, electric or hybrid vehicles comprising a battery aim to progressively replace combustion engine vehicles such as either gas or diesel vehicles. It has turned out that the battery is a relatively complex vehicle component. Depending on the positioning of the battery in the vehicle, it may be necessary to protect it from impact and from the outside environment, which can have extreme temperatures and variable humidity. It is also necessary to avoid any risk of flames.

Additionally, it is important that the operating temperature thereof not exceed 55° C. in order to not break down the cells of the battery and to preserve the life thereof. Conversely, for example in winter, it may be necessary to increase the battery temperature so as to optimize operation thereof.

The electric or hybrid motor vehicle thus needs a cooling and/or heating device for the battery. Cooling devices for a battery, consisting in the circulation of a heat transfer fluid around the battery, are known, as are batteries comprising a protective compartment. In particular, today, batteries are equipped with a metal compartment. Additionally, the shapes given to a metal structure result from a stamping method. However, when the shape of the compartment is complex, for example because of its placement, the stamping method is not the most effective for obtaining this type of specificity. This compartment also has the disadvantage of being relatively heavy and breaking down relatively quickly over time, in particular if it is located in a humid environment.

Thus, a light and resistant structure is sought that can both protect the battery from the external environment and act as a heat exchanger. Thus, the elements of the device must:
- be watertight to transported fluids and therefore have barrier properties to these fluids (and in particular to fluorocarbon refrigerant compounds such as R134a, R-1234yf or R-1234ze), as well as to water and oxygen. The term "barrier property" means that the structure is impermeable to the fluids in automotive air-conditioning lines and therefore allows no emission of fluids from the air conditioning line into the atmosphere.
- demonstrate chemical resistance to transported fluids, compressor oils, water and oxygen, in order to avoid excessive degradation over the long term;
- not only have sufficient mechanical strength (in particular bursting strength) and allow for vibration damping;
- demonstrate satisfactory thermal resistance, given that the transported fluids can be at a high temperature, and that the environmental temperature can also be high (in particular in automotive air conditioning, the parts concerned can be arranged in the vicinity of the engine) and in particular to ZnCl2.

Thus, materials are sought for replacing the known metal structures, which meet the specific list of specifications mentioned above, and for improving the thermal transfer occurring between the battery and the heat transfer fluid in a cooling and/or heating device for a battery.

DESCRIPTION OF THE INVENTION

These goals are achieved by virtue of a device intended to be used in a cooling and/or heating circuit for an electric or hybrid motor vehicle battery comprising:
- an outer envelope consisting of a composition comprising:
  - 20 to 65% by weight in relation to the total weight of the composition of reinforcing fibers, which do not have thermally conducting properties,
  - the complement being a matrix comprising mostly at least one polyamide and
- an inner envelope disposed opposite the battery and intended to be in contact with a heat transfer fluid, consisting of a composition comprising:
  - 5 to 65% by weight in relation to the total weight of the composition of reinforcing fibers,
  - 10 to 20% by weight, in relation to the total weight of at least one thermally conductive component, when the reinforcing fibers used are not thermally conductive,
  - at least one flame retardant, and
  - the complement being a matrix comprising mostly at least one polyamide chosen from semi-aromatic polyamides and polyamides consisting of units having an average number of carbon atoms per nitrogen atom ranging from 7 to 10, advantageously from 7.5 to 9.5;
- a heat transfer fluid inlet; and
- a heat transfer fluid outlet, the device delimiting a cooling and/or heating volume of the battery.

The cooling and/or heating device for a battery according to the invention has the advantage of being lighter than a device comprising a metal structure. This weight savings contributes to the desired energy or fuel efficiency for vehicles described as clean.

Depending on the placement thereof in the vehicle, this device can be found in contact with an aggressive environment, such as high temperature in summer or low temperature in winter, contact with zinc chloride, impacts, or high humidity. It was observed that the device according to the invention has a satisfactory resistance to these external stresses.

Further, it was observed that according to automobile manufacturers, the shape of the batteries may be varied. In fact, the manufacturers seek to house this battery in spaces unused or relatively unusable until now. The shaping of a plastic by molding or injection is easier to do than that of a metal plate.

BRIEF DESCRIPTION OF THE FIGURES

FIG. 1 is a cross-sectional view of a cooling and/or heating device for a battery for an electric or hybrid motor vehicle.

FIG. 2 is a cross sectional view of a portion of a cooling and/or heating device for a battery for electric or hybrid automotive vehicle, FIG. 2 showing an outer envelope configuration alternative to the outer envelope shown in FIG. 1.

DETAILED DESCRIPTION

Figure 3:
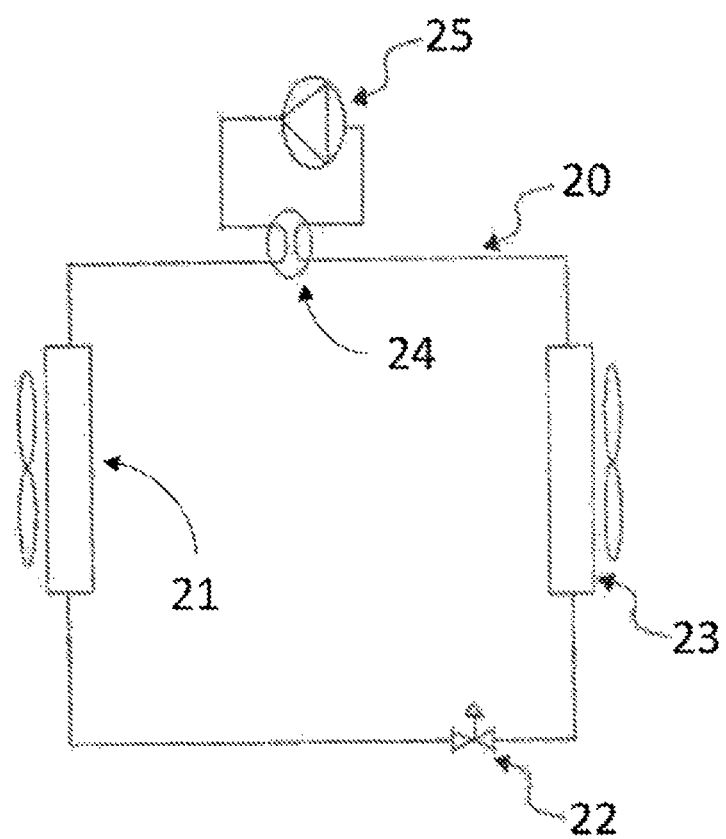
FIG. 3 shows a cooling and/or heating circuit of a battery incorporating the device according to the invention.

Other characteristics, features, subjects and benefits of the present invention will appear even more clearly after reading the description and examples that follow.

It is further indicated that the expressions "between . . . and . . . " and "from . . . to . . . " used in the present description must be understood as including each of the indicated limits.

The Device

The device according to the invention comprises:
an outer envelope,
an inner envelope,
a heat transfer fluid inlet; and
a heat transfer fluid outlet,
the device delimiting a cooling and/or heating volume of the battery.

Outer Envelope

The outer envelope consists of a composition comprising:
20 to 65% by weight in relation to the total weight of the composition of reinforcing fibers,
the complement being a matrix comprising mostly at least one polyimide.

Polyamides

The term "polyimide" refers equally to a homopolyamide or to a copolyamide.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the skilled person.

The polyamide can be obtained from the polycondensation of lactam units, amino acid units and/or XY units, where X is a diamine and Y is a dicarboxylic acid (or diacid).

Lactams and amino acids have 4 to 12 carbon atoms. Preferably, they are selected from pyrrolidinone, 2-piperidinone, caprolactam, aminohexanoic acid, pelargolactam, decanolactam, undecanolactam, 10-aminoundecanoic acid, amino-11-undecanoic acid, amino-12-dodecanoic acid, lauryllactam, enantholactam, and caprylolactam.

Advantageously, the lactams and amino acids are C11 and C12.

The diamine can be linear or branched aliphatic, or cycloaliphatic, preferably linear or branched aliphatic, particularly linear. The dicarboxylic acid can be aliphatic, cycloaliphatic, or aromatic, and is preferably aliphatic or aromatic.

In the case of polyamides obtained from the polycondensation of XY units, the diamine (X) can be C4-C36, in particular C6-C22, specifically C6-C18, and the dicarboxylic acid (Y) can be C4-C36, in particular C6-C22, specifically C6-C18.

Advantageously, the diamine is selected from butanediamine, pentanediamine, 2-methyl-1,5-pentanediamine, 1,6-hexamethylenediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine 1,11-undecanediamine, 2-butyl-2-ethyl-1,5-pentanediamine, 1,12-dodecanediamine, 1,13-tridecanediamine, 1,14-tetradecanediamine, hexadecanediamine, octadecanediamine, octadecenediamine, eicosanediamine, docosanediamine, and the fatty acid diamines, 1,3-xylylene diamine (MXD) and 1,4-xylylene diamine (PXD), bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)-butane, bis(3-methyl-4-aminocyclohexyl)methane or 3'-dimethyl-4,4'-diaminodicyclohexyl-methane, commonly referred to as "BMACM" or "MACM" (and hereinafter denoted B), p-bis(aminocyclohexyl)methane commonly referred to as "PACM" (and hereinafter denoted P), isopropylidenedi(cyclohexylamine) commonly referred to as "PACP", isophorone diamine (hereinafter denoted IPD) and 2,6-bis(amino methyl)norbornane commonly referred to as "BAMN", in particular 1,10-decanediamine.

A non-exhaustive list of these cycloaliphatic diamines is given in the publication "Cycloaliphatic Amines" (Encyclopedia of Chemical Technology, Kirk-Othmer, 4th Edition (1992), pp. 386-405).

Advantageously, the dicarboxylic acid is selected from succinic acid, pentanedioic acid, adipic acid, suberic acid, azelaic acid, sebacic acid, undecanedioic acid, dodecanedioic acid, brassylic acid, tetradecanedioic acid, hexadecanedioic acid, octadecadioic acid, octadecenoic acid, eicosanedioic acid, docosanedioic acid and dimers of fatty acids containing 36 carbons, terephthalic acid (denoted T), isophthalic acid (denoted I), and especially dodecanedioic acid.

Advantageously, the diamine is selected from 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, especially 1,10-decanediamine, and the dicarboxylic acid is selected from sebacic acid, undecanedioic acid, dodecanedioic acid, brassylic acid, tetradecanedioic acid, terephthalic acid (denoted T), isophthalic acid (denoted I), especially dodecanedioic acid.

More advantageously, the lactam is lauryllactam, the amino acid is selected from 10-aminoundecanoic acid, 11-aminoundecanoic acid, 12-amino-dodecanoic acid, the diamine is selected from 2-methyl-1,5-pentanediamine, 1,6-hexamethylenediamine, 1,9-nonanediamine, 2-methyl-1,8-octane-diamine, 1,10-decanediamine and 1,12-dodecanediamine, and the dicarboxylic acid is selected from adipic acid, sebacic acid, dodecanedioic acid, terephthalic acid (denoted T) and isophthalic acid (denoted I).

According to a highly preferred embodiment, the lactam is lauryllactam, the amino acid is selected from 10-aminoundecanoic acid, 11-aminoundecanoic acid, 12-amino-dodecanoic acid, the diamine is selected from 2-methyl-1,5-pentanediamine, 1,6-hexamethylenediamine, 1,10-decanediamine and 1,12-dodecanediamine and the dicarboxylic acid is selected from adipic acid, sebacic acid, dodecanedioic acid, terephthalic acid (denoted T) and isophthalic acid (denoted I).

Preferably, the outer envelope comprises a polyamide matrix comprising at least one polyamide chosen from semi-aromatic polyamides and polyamides consisting of units having an average number of carbon atoms per nitrogen atom ranging from 9 to 18.

The average number of carbon atoms per nitrogen atom is the average number of carbon atoms per unit, that is per linkage between two nitrogen atoms. Within a polyamide, the units are linked to each other by amide functions: —CO—NH—. Thus, there are as many nitrogen atoms as there are (—CO—NH—) amide groups. In the case of a PA-XY homopolyamide, the number of carbon atoms per nitrogen atom is the mean of unit X and unit Y. Thus PA612, derived from the polycondensation of hexanediamine and dodecanedioic acid, is a PA with 9 carbon atoms per nitrogen atom; in other words, it is a C9 PA, based on the following calculation: (6+12)/2. In the case of copolyamides, the number of carbon atoms per nitrogen atom is calculated according to same principle. The molar ratios of the various amide units are used for the calculation. Thus the coPA-6.T/6.6 comprising 60% 6T and 40% 66 is C6.6: 60% x[(6+8)/2]+40% x[(6+6)/2]=6.6.

Advantageously, the polyamide present in the composition of the outer envelope is selected from PA612, PA1010, PA10T, PA10T/1010, PA11, PA12, PA11/10T, PA12/10T, PA 1012, PA 618, PA 12T, PA 1010/1012, PA BACT/6T, PA BACT/10T, PA BACT/12T PA MPMDT/6T, PA MPMDT/10T, PA MPMDT/12T, PA MXDT/6T, PA MXDT/10T, PA MXDT/12T, PA 11/BACT/6T, PA 11/BACT/10T, PA 11/BACT/12T, PA 11/MPMDT/6T, PA 11/MPMDT/10T, PA 11/MPMDT/12T, PA 11/MXDT/6T, PA 11/MXDT/10T, PA 11/MXDT/12T, and mixtures of these. Preferably, the polyamide constituting the matrix of the outer envelope is chosen from PA12, PA 11, PA 1010, PA 1012 and PA11/10T.

The term "mostly", within the meaning of the present invention, is understood to mean a proportion of more than 50% of polyamide within the matrix of the composition. Preferably, the one or more polyamides represent 50 to 80% by weight in relation to the total weight of the matrix.

According to a preferred embodiment, the composition of the outer envelope comprises more than 25% by weight of polyamide relative to the total weight of the composition.

Reinforcing Fibers

The composition constituting an outer envelope according to the invention comprises from 20 to 65% by weight in relation to the total weight of the composition of reinforcing fibers.

The fibers present in the composition of the envelope can have different dimensions. The reinforcing fibers can be short, long or continuous. A mixture of these fibers of various dimensions and/or various type may also be used.

Preferably, the "short" fibers are between 200 and 400 μm long. The so-called long fibers preferably have a length over 1000 μm. The length of the glass fibers is measured according to the ISO 22314:2006(E) standard.

These reinforcing fibers may be chosen from:
mineral fibers, those having high melting temperatures Tm' greater than the melting temperature Tm of said polyamide present in the matrix of the composition of the envelope according to the invention and greater than the polymerization and/or implementation temperature,
polymeric or polymer fibers having a melting temperature Tm' or if not the Tm', a glass transition temperature Tg', greater than the polymerization temperature or greater than the melting temperature Tm of said polyamide present in the matrix of the composition of the envelope according to the invention and greater than the implementation temperature,
natural fibers;
or mixtures of the fibers cited above;

Examples of inorganic fibers suitable for the invention are carbon fibers, which includes fibers of nanotubes or carbon nanotubes (CNT), carbon nanofibers or graphenes; silica fibers such as glass fibers, in particular type E, R or S2; boron fibers; ceramic fibers, in particular silicon carbide fibers, boron carbide fibers, boron carbonitride fibers, silicon nitride fibers, boron nitride fibers, basalt fibers; fibers or filaments containing metals and/or their alloys; metal oxide fibers, in particular of alumina ($Al_2O_3$); metalized fibers such as metalized glass fibers and metalized carbon fibers or mixtures of previously cited fibers.

The following can be listed as suitable polymer fibers for the invention:
amorphous thermoplastic polymer-based fibers and have a glass transition temperature Tg greater than the Tg of the polyamide or mixture of polyamides present in the matrix when it is amorphous; or greater than the Tm of the polyamide or mixture of polyamides present in the matrix when it is semi-crystalline. Advantageously, they are semi crystalline thermoplastic polymer-based and have a melting point Tm greater than the Tg of the polyamide or polyamide mixture present in the matrix when the matrix is amorphous; or greater than Tm of the polyamide or mixture of polyamides present in the matrix when the matrix is semi crystalline. Thus, there is no melting risk for the organic fibers constituting the reinforcing material during the impregnation by the thermoplastic matrix of the final composite.
the thermosetting polymer fibers and more particularly chosen from: unsaturated polyesters, epoxy resins, vinyl esters, phenol resins, polyurethanes, cyanoacrylates and polyimides, such as bis-maleimide resins, aminoplasts resulting from the reaction of an amine such as melamine with an aldehyde such as glyoxal or formaldehyde,
fibers of thermoplastic polymers and more particularly chosen from: polyethylene terephthalate (PET), polybutylene terephthalate (PBT);
polyamide fibers,
aramid fibers (such as Kevlar®) and aromatic polyamides such as those having one of the formulas: PPDT, MPDI, PAA and PPA, with PPD and MPD being respectively p- and m-phenylene diamine, PAA being polyarylamides and PPA being polyphthalamides;
fibers of polyamide block copolymers such as polyamide/polyether, fibers of polyarylether ketones (PAEK) such as polyetherether ketone (PEEK), polyetherketone ketone (PEKK), polyetherketoneetherketone ketone (PEKEKK).

Among the fibers of natural origin, and in particular plant fibers, the following can be listed: fibers based on flax, ricin, wood, kenaf, coconut, hemp, jute, lignin, bamboo, silk, in particular spider silk, sisal and other cellulose fibers, in particular viscose. These plant fibers can be used pure, treated or coated with a coating layer, in order to improve the adherence and impregnation of the polymer matrix.

The reinforcing fibers can constitute a fibrous material which can also be a fabric, braided or woven with fibers.

It can also correspond to fibers with support threads. These component fibers may be used alone or in mixtures. Thus, organic fibers can be mixed with mineral fibers in order to be impregnated with the polymer matrix and to form the pre-impregnated fibrous material.

The organic fiber strands can have several grammages. They can further have several geometries. The fibers can come in short fiber form, which then make up felts or nonwovens which can come in the form of strips, layers or pieces, or in continuous fiber form, which make up 2D fabrics, braids or strands of unidirectional (UD) or nonwoven fibers. The component fibers of the fibrous material can further assume the form of a mixture of these reinforcing fibers with different geometries.

Preferably, the fibrous material is composed of continuous carbon, glass or silicon carbide fibers or mixtures thereof, in particular carbon fibers. It is used in the form of a roving or several rovings.

Preferred short reinforcing fibers are short fibers chosen from: carbon fibers, including metalized fibers, glass fibers, including metalized glass fibers like E, R, S2, aramid fibers (like Kevlar®) or aromatic polyamides, polyaryl ether ketone (PAEK) fibers, such as polyetherether ketone (PEEK), polyetherketone ketone (PEKK) fibers, polyetherketoneetherketone ketone (PEKEKK) fibers or mixtures thereof.

Preferably, the reinforcing fibers are selected from glass, carbon, ceramic and aramid fibers or mixtures thereof.

Preferably, the outer envelope of the device according to the invention has heat-insulating properties. According to this preferred embodiment, the reinforcing fibers will be preferably chosen from glass fibers, basalt fibers and aramid fibers.

Depending on the size of the fibers used: short, long or continuous, the reinforcing fiber content may be different in the composition.

Thus, in the case of short reinforcing fibers, the fiber content is preferably between 20 and 60% by weight of reinforcing fibers. In the case of long or continuous reinforcing fibers, the fiber content is preferentially between 40 and 65% by weight of reinforcing fibers.

Flame Retardants

The composition constituting the outer envelope of the device according to the invention may comprise at least one flame retardant.

Preferably, the flameproofing agent is selected from halogen-free flameproofing agents, such as described in US 2008/0,274,355 and in particular a metal salt chosen from a phosphinic acid metal salt, a metal salt of diphosphinic acid, a polymer containing at least one metal salt of phosphinic acid, a polymer containing at least one metal salt of diphosphinic acid. The flameproofing agent can also be selected from red phosphorus, antimony oxide, zinc oxide, iron oxide, magnesium oxide, metal borates, such as zinc borate, melamine pyrophosphates, melamine cyanurates, and siliconated or fluoridated type non-drip agents. The flameproofing agent can also be a mixture of the aforementioned retardants.

They may also be halogenated flame-retardant agents such as a brominated or polybrominated polystyrene, a brominated polycarbonate or a brominated phenol.

The flame retardant may also be selected from the metal salt of phosphinic acid of the following formula (I) and the metal salt of diphosphinic acid of the following formula (II):

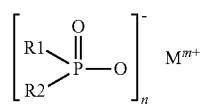

(I)

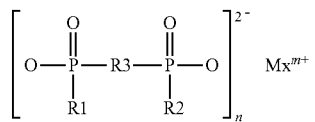

(II)

where
R1 and R2, independently of each other, designate a linear or branched C1-C6 alkyl group or an aryl group;

R3 represents a linear or branched C1-C10 alkylene group, C6-C10 arylene group, C6-C10 alkylarylene group, or C6-C10 arylalkylene group, M is a Mg, Ca, Al, Sb, Sn, Ge, Ti, Zn, Fe, Zr, Ce, Bi, Sr, Mn, Li, Na, K and/or a protonated amine base m is an integer ranging from 1 to 4;

n is an integer ranging from 1 to 4;

x is an integer ranging from 1 to 4;

n and m being chosen such that the salt is neutral, meaning that it does not carry an electrical charge.

Preferably, M represents a calcium, magnesium, aluminum or zinc ion.

Preferably R1 and R2, independent of each other, designate a methyl, ethyl, n-propyl, iso-propyl, n-butyl, tertiary-butyl, n-pentyl and/or phenyl group.

Preferably, R3 represents a methylene, ethylene, n-propylene, iso-propylene, n-butylene, tert-butylene, n-pentylene, n-octylene, n-dodecylene, phenylene, naphthalene, methylphenylene, ethylphenylene, tertiary-butylphenylene, methyl naphthalene, ethylnaphthalene, tert-butylnaphthalene, phenylmethylene, phenylethylene, phenylpropylene, or phenylbutylene group.

The flame retardant may be the one with trade name Exolit OP 1230 sold by Clariant, which is the aluminum salt of diethylphosphinic acid (CAS No. 225789-38-8).

More particularly, the flame-retardant content is between 0 and 30% by weight, preferably 15 and 25% by weight, and more particularly between 17 and 22% by weight in relation to the total weight of the composition.

Impact Modifiers

The composition constituting the envelope of the device according to the invention may comprise at least one impact modifier. Preferably, the composition constituting the envelope of the device according to the invention may comprise from 0 to 20% by weight in relation to the total weight of the composition of at least one impact modifier The impact modifier is advantageously constituted by a polymer having a flexural modulus below 100 MPa measured according to standard ISO 178 at 50% RH and a Tg below 0° C. measured according to standard 11357-2 of 2013.

The glass transition temperature Tg of the polyamides is measured using a differential scanning calorimeter (DSC), after a second heating pass, according to ISO standard 1 1357-2:2013. The heating and cooling rate is 20° C./min.

Preferably, the impact modifier consists of one or more polyolefins, a part or all thereof bearing a function chosen from the carboxylic acid, carboxylic anhydride and epoxide functions. Very specifically, the polyolefin can be chosen from an elastomeric ethylene and propylene copolymer (EPR), an elastomeric ethylene-propylene-diene copolymer (EPDM) and an ethylene/alkyl (meth)acrylate copolymer.

The composition may comprise up to 20% by weight, in relation to the total weight of said composition, of a semi-crystalline polyolefin or a mixture of polyolefins, having a flexural modulus, measured according to the ISO standard 178 at 50% RH, over 300 MPa, advantageously over 800 MPa.

This impact modifier may be a functionalized polyolefin (B1).

According to the invention, functionalized polyolefin (B1) is understood to mean the following polymers.

The functionalized polyolefin (B1) can be an alpha-olefin polymer having reactive units: the functionalities. Such reactive units are carboxylic acid, anhydride or epoxy functions.

The homopolymers or copolymers of alpha-olefins or diolefins can be given as examples of polyolefins, such as for example, ethylene, propylene, 1-butene, 1-octene, butadiene, and more specifically:

- the homopolymers and copolymers of ethylene, particularly LDPE, HDPE, LLDPE (linear low-density polyethylene), VLDPE (very low-density polyethylene) and metallocene polyethylene;
- homopolymers or copolymers of propylene;
- ethylene/alpha-olefin copolymers such as ethylene/propylene, EPRs (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers;
- copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

These polyolefins described above can be grafted, copolymerized or terpolymerized by reactive units (the functionalities), such as carboxylic acid, anhydride or epoxy functions.

More specifically these polyolefins are grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or by carboxylic acid anhydrides such as maleic anhydride.

The functionalized polyolefin (B1) may be chosen from the following, maleic anhydride or glycidyl methacrylate grafted (co)polymers wherein the graft rate is for example from 0.01 to 5% by weight:

- of PE, of PP, of copolymers of ethylene with propylene, butene, hexene, or octene containing for example from 35 to 80% by weight of ethylene;
- ethylene/alpha-olefin copolymers such as ethylene/propylene, EPRs (abbreviation for ethylene-propylene-rubber) and ethylene/propylene/diene (EPDM);
- styrene/ethylene-butene/styrene (SEBS), styrene/butadiene/styrene (SBS), styrene/isoprene/styrene (SIS), styrene/ethylene-propylene/styrene (SEPS) block copolymers;
- ethylene and vinyl acetate copolymers (EVA), containing up to 40% by weight of vinyl acetate;
- ethylene and alkyl (meth)acrylate copolymers, containing up to 40% by weight of alkyl (meth)acrylate;
- ethylene and vinyl acetate (EVA) and alkyl (meth)acrylate copolymers, containing up to 40% by weight of comonomers.

A functionalized polyolefin is for example a PE/EPR mixture, the ratio by weight whereof can vary widely, for example between 40/60 and 90/10, said mixture being co-grafted with an anhydride, in particular maleic anhydride, according to a graft rate for example of 0.01 to 5% by weight.

The functionalized polyolefin (B1) can also be selected from ethylene/propylene copolymers with predominantly maleic anhydride grafted propylene condensed with a monoamine polyamide (or a polyamide oligomer) (products described in EP-A-0,342,066).

The functionalized polyolefin (B1) can also be a co- or terpolymer of at least the following units:

(1) ethylene;
(2) alkyl methacrylate or saturated carboxylic acid vinyl ester; and
(3) anhydride such as maleic or methacrylic anhydride or epoxies such as glycidyl methacrylate.

By way of example of functionalized polyolefins of the latter type, mention may be made of the following copolymers, where ethylene represents preferably at least 60% by weight and where the termonomer (the function) represents for example from 0.1 to 12% by weight of the copolymer:

- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth)acrylic acid or maleic anhydride or glycidyl methacrylate copolymers.

In the preceding copolymers, (meth)acrylic acid can be salified with Zn or Li. The term "alkyl (meth)acrylate" in (B1) denotes C1 to C8 alkyl methacrylates and acrylates, and can be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned hereinbefore (B1) may be statistically or sequentially copolymerized and have a linear or branched structure.

The molecular weight, the index MFI, the density of these polyolefins may also vary widely, which the person skilled in the art will know. MFI, abbreviation for melt flow index, is a measure of fluidity when melted. It is measured according to standard ASTM 1238.

Advantageously the functionalized polyolefins (B1) are chosen from any polymer comprising alpha-olefin units and units carrying polar reactive functions like epoxy, carboxylic acid or carboxylic acid anhydride functions. As examples of such polymers, mention may be made of terpolymers of ethylene, alkyl acrylate and maleic anhydride or glycidyl methacrylate like Lotader® from the Applicant or maleic anhydride grafted polyolefins like Orevac® from the Applicant and terpolymers of ethylene, alkyl acrylate and (meth)acrylic acid. Mention may also be made of homopolymers or copolymers of by a carboxylic acid anhydride grafted polypropylene then condensed with polyamides or polyamide monoamine oligomers, as described in the application EP 0,342,066.

More specifically, the functionalized polyolefins (B1) are:
- ethylene, alkyl acrylate and maleic anhydride terpolymers;
- ethylene, alkyl acrylate and glycidyl methacrylate terpolymers;
- maleic anhydride grafted polypropylenes and polyethylenes;
- maleic anhydride grafted ethylene and propylene copolymers and possibly diene monomer;
- maleic anhydride grafted ethylene and octene copolymers;
and mixture thereof.

The functionalized polyolefin (B1) is present with a concentration of between 0 and 20% by weight, preferably between 1 and 10% by weight in relation to the total weight of the composition.

Advantageously, the composition according to the invention can comprise at least one non-functionalized polyolefin (B2).

A non-functionalized polyolefin (B2) is conventionally a homopolymer or copolymer of alpha-olefins or diolefins, such as for example, ethylene, propylene, 1-butene, 1-octene, butadiene. By way of example, mention may be made of:
- the homopolymers and copolymers of polyethylene, particularly LDPE, HDPE, LLDPE (linear low-density polyethylene), VLDPE (very low density polyethylene) and metallocene polyethylene.
- homopolymers or copolymers of propylene;
- ethylene/alpha-olefin copolymers such as ethylene/propylene, EPRs (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers;
- copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight;

and mixture thereof.

The copolymers mentioned above (B2) may be statistically or sequentially copolymerized and have a linear or branched structure.

Advantageously the non-functionalized polyolefins (B2) are chosen from homopolymers or copolymers of polypropylene and any ethylene homopolymer or ethylene copolymer and a higher alpha-olefin comonomer such as butene, hexene, octene or 4-methyl-1-pentene. PP (polypropylene), high density polyethylene, medium-density polyethylenes, linear low-density polyethylenes, low-density polyethylenes and very low-density polyethylenes can be cited as examples. These polyethylenes are known by the person skilled in the art as being products from a free-radical method, from a Ziegler catalysis method, or, more recently, from metallocene catalysis. The copolymers of ethylene and vinyl acetate (EVA) are also preferred, such as those sold under the tradename EVATANE® by the Applicant.

When the composition constituting the outer envelope of the device according to the invention comprises one or more non-functionalized polyolefins, the MFI of (A) and the MFIs of (B1) and (B2) may be chosen over a wide range, it is however recommended that the viscosities of (B1) and (B2) be close so as to improve the dispersion of (B1) and (B2).

The non-functionalized polyolefin is present with a concentration of between 0 and 20% by weight, preferably between 1 and 10% by weight in relation to the total weight of the composition.

The impact modifier may also be a copolymer formed of polyamide blocks and polyether blocks, where the polyamide blocks and polyether blocks are linked by an ester function. These products are described in the document FR 2 273 021 and sold by Arkema under the PEBAX® tradename.

The copolymers with polyamide blocks (abbreviated PA below) and polyether blocks (abbreviated PE below) result from the copolycondensation of polyamide blocks with reactive ends with polyether blocks with reactive ends. For example, the following can be reacted:
- polyetherdiol, and a carboxylic diacid polyamide,
- polyetherdiamine and a carboxylic diacid polyamide;
- polyetherdiol and a diamine polyamide.

The block polyamides with dicarboxylic chain ends come for example from the condensation of polyamide precursors in presence of a chain regulator carboxylic diacid. The block polyamides with diamine chain ends come for example from the condensation of polyamide precursors in the presence of a chain regulator diamine. Thus, the bond between the blocks is either an ester bond or an amide bond. The polymers with PA blocks and PE blocks may comprise a single PA block and a single PE block.

They may also comprise several structurally identical PA blocks of the one or more monomers making up the polyamide and identical PE distributed randomly. Said polymers may be prepared by simultaneous reaction of PE blocks and PA block precursors. A polymer results having PE blocks and PA blocks with highly variable length depending on the moment at which the chain regulator acts during the formation of the PA block, but also the various reagents having randomly reacted which are distributed randomly (statistically) along the polymer chain.

The composition constituting the outer envelope of the device according to the invention comprises 0 to 30% by weight in relation to the total weight of the composition of at least one impact modifier, preferably from 0.1 to 25%, and more preferably from 5 to 20%.

Additives

The composition constituting the outer envelope of the device according to the invention may also comprise 0 to 20% additives.

Preferably, the additives present in the composition forming the envelope are selected from heat stabilizers, plasticizers, lubricants, organic or inorganic pigments, anti-UV agents, antistatic agents, mineral fillers, and organic fillers, such as, for example, talc, calcium carbonate, titanium dioxide, zinc oxide and organic fillers.

Among the fillers, silica, titanium oxide or even glass beads can be listed.

The thermal stabilizer may be chosen from a copper-based stabilizer, an organic stabilizer and a mixture thereof.

The copper-based stabilizer can be made up of one or more constituents chosen from copper-based compounds such as cuprous chloride, cupric chloride, cuprous bromide, cupric bromide, cuprous iodide, cupric iodide, cuprous acetate and cupric acetate. Halides, and acetates of other metals such as silver can be listed. These copper-based compounds are typically associated with halides of alkali metals. A well-known example is the mixture of CuI and KI, where the CuI:KI ratio is typically inclusively between 1:5 to 1:15. An example of such a stabilizer is Ciba's Polyadd P201. More details on stabilizers containing copper are found in U.S. Pat. No. 2,705,227. More recently, copper-based stabilizers such as copper complexes like Brüggemann's Bruggolen H3336, H3337, H3373 have appeared. The copper-based stabilizer is chosen from copper halides, copper acetate, copper halides or copper acetate in mixture with at least one alkaline metal halide, and mixtures thereof, preferably mixtures of copper iodide and potassium iodide (CuI/KI).

The organic stabilizer may be chosen, without this list being restrictive, from:
- phenol antioxidants, for example Ciba's Irganox 245, Irganox 1010, Irganox 1098, Ciba's Irganox MD1024, Great Lakes' Lowinox 44B25;

phosphorus-based stabilizers, such as phosphites, for example Ciba's Irgafos 168;
a UV absorber, such as Ciba's Tinuvin 312,
a HALS, as previously stated,
an amine type stabilizer, such as Crompton's Naugard 445, or even a hindered amine type such as Ciba's Tinuvin 770,
a polyfunctional stabilizer such as Clariant's Nylostab S-EED.

A mixture of two, or more, of these organic stabilizers may obviously be envisaged.

The quantity of thermal stabilizer(s) within the composition is preferably between 0.05 and 5% by weight, in relation to the total weight of the composition.

Preferably, the additives present in the composition generally have a concentration from 0.1 to 15% by weight, preferably 1 to 15 by weight relative to the total weight of the composition.

Depending on the position of the battery in the vehicle, the person skilled in the art will know how to adapt the content of reinforcing fiber, impact modifier or additive. If the battery is positioned in the luggage compartment, its exterior compartment will be less exposed to an aggressive exterior environment. The percentage of reinforcing and impact modifying fiber may be in the lower range of the claimed range. However, if the battery is in contact with the ambient air, then the content of reinforcing fibers and impact modifiers will be higher, and the composition will have to include additives, such as antioxidants or UV filters.

According to a preferred embodiment of the invention, the outer envelope consists of a composition consisting of:
20 to 65% by weight in relation to the total weight of the composition of reinforcing fibers, which do not have thermally conducting properties,
0.1 to 30% by weight in relation to the total weight of at least one impact modifier,
0 to 30% a flame retardant,
0 to 20% by weight in relation to the total weight of the composition of additives.
the complement being a matrix comprising mostly at least one polyamide.

According to another preferred embodiment of the invention, the outer envelope consists of a composition comprising
20 to 65% by weight in relation to the total weight of the composition of reinforcing fibers, which do not have thermally conducting properties,
0.1 to 30% by weight in relation to the total weight of at least one impact modifier,
15 to 25% a flame retardant,
0 to 20% by weight in relation to the total weight of the composition of additives.
the complement being a matrix comprising mostly at least one polyamide.

According to another preferred embodiment of the invention, the outer envelope is made of a composition comprising
40 to 65% by weight in relation to the total weight of the composition of reinforcing fibers, which do not have thermally conducting properties,
5 to 20% by weight in relation to the total weight of at least one impact modifier,
15 to 25% a flame retardant,
1 to 20% by weight, in relation to the total weight of the composition of additives,
the complement being a matrix comprising mostly at least one polyamide.

According to another preferred embodiment of the invention, the outer envelope consists of a composition consisting of
40 to 65% by weight in relation to the total weight of the composition of reinforcing fibers, which do not have thermally conducting properties,
5 to 20% by weight in relation to the total weight of at least one impact modifier,
15 to 25% a flame retardant;
1 to 20% by weight, in relation to the total weight of the composition of additives,
the complement being a matrix comprising mostly at least one polyamide.

Inner Envelope

The inner envelope, disposed opposite the battery and intended to be in contact with a heat transfer fluid, consists of a composition comprising:
5 to 65% by weight, in relation to the total weight of the reinforcing fiber composition,
10 to 20% by weight, in relation to the total weight of at least one thermally conductive component, when the reinforcing fibers used are not thermally conductive,
at least one flame retardant, and
the complement being a matrix comprising mostly at least one polyamide chosen from semi-aromatic polyamides and polyamides consisting of units having an average number of carbon atoms per nitrogen atom ranging from 7 to 10, advantageously from 7.5 to 9.5.

Polyamides

Like the polyamides defined hereinbefore for the outer envelope, suitable polyamides for the inner envelope may be homopolyamides or copolyamides.

The lactams and amino acids used to produce the homopolyamides must have a mean number of carbon atoms per nitrogen atom of between 7 and 10. Advantageously, the lactams and amino acids are C10.

The monomers useful for obtaining the polyamide(s) present in the matrix of the composition constituting the inner envelope are selected from the lists of polyamides of the outer layer.

According to a preferred embodiment, the polyamide of the inner layer is selected from PA610, PA410, PA412, PA612, PA1010, PA6T, PA6I, PA9T, PA10T, PA6T/6I, PA6T/10T, PA6T/1010, PA10T/1010, and mixture thereof. Preferably, the polyamide constituting the inner envelope matrix is selected from PA 610, PA612, PA9T, PA10T, and PA 1010.

Reinforcing Fiber

The reinforcing fibers present in the composition constituting the inner envelope are identical to those listed above for the outer envelope.

Conductive Components

The composition constituting the inner envelope of the device according to the invention comprises 10 to 20% by weight in relation to the total weight of the composition of at least one thermoconductive component, preferably from 12 to 18%.

The thermoconductive components make it possible to give the polymer matrix, which receives them, a thermal conductivity, or else to increase the thermal conductivity thereof.

The thermoconductive components may be chosen among carbon, carbon fibers, carbon black, for example that sold by Imerys under the tradename Ensaco 250G, carbon nanotubes (denoted CNT), like for example those sold by Arkema under the form of MB Graphistrength®, expanded graphite like for example the Timrex®C-THERM™ product line, and in particular the Timrex®C-THERM™ 001 products sold by Imerys, aluminum nitride and boron nitride.

It is possible that the selected reinforcing fibers have heat-conducting properties, such as for example carbon fibers, CNTs, carbon nanofibers or graphenes. In this event, the composition may not comprise a thermoconductive component.

Flame Retardants

The flame retardants present in the composition constituting the inner envelope are identical to those listed hereinbefore for the outer envelope.

Impact Modifiers

The impact modifiers present in the composition constituting the inner envelope are identical to those listed hereinbefore for the outer envelope.

Additives

The additives present in the composition of the inner envelope are identical to those listed hereinbefore for the outer envelope.

According to a preferred embodiment of the invention, the inner envelope consists of a composition comprising:
  5 to 65% by weight, in relation to the total weight of the reinforcing fiber composition,
  10 to 20% by weight, in relation to the total weight of at least one thermoconductive component, when the reinforcing fibers used are not thermally conductive,
  15 to 25% a flame retardant;
  0 to 30% by weight in relation to the total weight of at least one impact modifier,
  0 to 20% by weight in relation to the total weight of the composition of additives,
  the complement being a matrix comprising mostly at least one polyamide.

According to a preferred embodiment of the invention, the inner envelope consists of a composition comprising:
  5 to 65% by weight, in relation to the total weight of the reinforcing fiber composition,
  10 to 20% by weight, in relation to the total weight of at least one thermoconductive component, when the reinforcing fibers used are not thermally conductive,
  15 to 25% a flame retardant;
  5 to 20% by weight in relation to the total weight of at least one impact modifier,
  1 to 20% by weight in relation to the total weight of the composition of additives,
  the complement being a matrix comprising mostly at least one polyamide.

According to a preferred embodiment of the invention, the inner envelope consists of a composition consisting of:
  5 to 65% by weight, in relation to the total weight of the reinforcing fiber composition,
  10 to 20% by weight, in relation to the total weight of at least one thermoconductive component, when the reinforcing fibers used are not thermally conductive,
  15 to 25% a flame retardant;
  5 to 20% by weight in relation to the total weight of at least one impact modifier,
  1 to 20% by weight in relation to the total weight of the composition of additives,
  the complement being a matrix comprising mostly at least one polyamide.

According to another preferred embodiment of the invention, the inner envelope consists of a composition comprising:
  5 to 65% by weight in relation to the total weight of the composition of reinforcing fibers, which have thermally conducting properties,
  15 to 25% a flame retardant;
  0 to 30% by weight in relation to the total weight of at least one impact modifier,
  0 to 20% by weight in relation to the total weight of the composition of additives.
  the complement being a matrix comprising mostly at least one polyamide.

According to another preferred embodiment of the invention, the inner envelope consists of a composition comprising:
  5 to 65% by weight in relation to the total weight of the composition of reinforcing fibers, which have thermally conducting properties,
  15 to 25% a flame retardant;
  5 to 20% by weight in relation to the total weight of at least one impact modifier,
  1 to 20% by weight in relation to the total weight of the composition of additives,
  the complement being a matrix comprising mostly at least one polyamide.

According to another preferred embodiment of the invention, the inner envelope consists of a composition comprising:
  5 to 65% by weight in relation to the total weight of the composition of reinforcing fibers, which have thermally conducting properties,
  15 to 25% a flame retardant;
  5 to 20% by weight in relation to the total weight of at least one impact modifier,
  1 to 20% by weight in relation to the total weight of the composition of additives,
  the complement being a matrix comprising mostly at least one polyamide.

According to another preferred embodiment of the invention, the inner envelope consists of a composition consisting of:
  5 to 65% by weight in relation to the total weight of the composition of reinforcing fibers, which have thermally conducting properties,
  15 to 25% a flame retardant;
  5 to 20% by weight in relation to the total weight of at least one impact modifier,
  1 to 20% by weight in relation to the total weight of the composition of additives,
  the complement being a matrix comprising mostly at least one polyamide.

Advantageously, when the battery comprises a plurality of adjacent cell packs, then the inner envelope encapsulates the assembly of cells by complementarity of shape.

According to another feature, the inner envelope and the outer envelope can be coated on the inside and/or the outside with a layer having a low water permeability.

By having one or more layers with a low water permeability a moisture barrier effect can be provided, meaning sealing the battery against heat transfer fluid or the environment outside the device according to the invention.

For the purposes of the present invention, inner is understood to mean a layer arranged facing the passage for the heat transfer fluid.

In the meaning of the present invention, outer is understood to mean a layer arranged facing the outside of the device according to the invention or facing the battery, the opposite of a layer arranged facing the passage for the heat transfer fluid.

In particular, according to an embodiment in which the selected heat transfer fluid is liquid, for example fluorinated compounds, the layer(s) having a low water permeability serve to avoid, according to the placement thereof, fluid leaks towards the battery or towards the outside of the cooling and/or heating device.

According to a preferred embodiment, this/these layer(s) can be of EVOH, polyolefins, such as polypropylene or polyethylenes: HDPE, LDPE.

Conductivity Measurement

Preferably, the ratio of the thermal conductivity ($\lambda$) of the inner envelope to the thermal conductivity ($\lambda$) of the outer envelope is at least greater than 1.5, preferably ranging from 1.5 to 300, more specifically from 2 to 100 and more preferentially from 2 to 50.

Preferably, the thermal conductivity ($\lambda$) of the outer envelope is less than or equal to 10 $W \cdot m^{-1} \cdot K^{-1}$, preferably between 0.1 and 10 $W \cdot m^{-1} \cdot K^{-1}$, more particularly between 0.3 and 1 $W \cdot m^{-1} \cdot K^{-1}$.

Thermal conductivity measurements of materials are done according to the HOT DISK technology such as described in the ISO 22007-2 standard.

The convection coefficient can also be used to qualify the heat transfer between an envelope and the fluid flowing in the device. In the device according to the invention, the outer envelope allows little or no heat transfer between the fluid and the envelope material. In contrast, the material of the inner envelope is chosen to allow maximum heat transfer between the inner envelope near or in contact with the battery and the fluid.

Method for Preparation of the Composition

The invention also covers a method for preparation of the composition such as defined above. According to this method, the composition may be prepared by any method which makes it possible to obtain a homogeneous mixture containing the composition according to the invention, and optionally other additives, such as molten state extrusion, compacting, or even roller mixer while considering the size of the reinforcing fibers.

Advantageously, the usual devices from the thermoplastics industry for mixing or kneading are used such as extruders, such as the double-screw type extruders, and kneaders, for example BUSS co-kneaders.

Method for Production of the Device

Depending on the size of the fibers, the battery device according to the invention can be made by various techniques.

When the fibers are short, the battery device according to the invention can be obtained by injection, extrusion, co-extrusion, hot compression, and multi-injection of at least one composition such as defined hereinbefore.

When the fibers are long or continuous, the battery device according to the invention can be made by various techniques chosen from: pultrusion, filament winding, thermal compression, infusion molding, resin transfer molding (RTM), structured reaction and injection molding (S-RIM) or injection-compression molding. A specific closed mold technique is RTM or S-RIM or injection-compression. The term "resin" in RTM here identifies the composition according to the invention without the reinforcing fibers.

According to a specific embodiment, the production method may comprise:
 a step of application of the reinforcing fibers in the mold, and then
 at least one step of impregnation of said fibers by a precursor composition of the composition according to the invention.

The Circuit

The present invention also relates to a cooling and/or heating circuit for an electric or hybrid motor vehicle battery, comprising a main heat transfer fluid circulation loop provided with means intended for circulation of the heat transfer fluid in the main loop.

Further, the main loop is connected to a reversible heat pump and a cooling and/or heating device such as previously described.

According to various embodiments, the heat transfer fluid is selected from a gas, for example air, a liquid, for example glycol water, hydrocarbon compounds, hydrofluorocarbons, ethers, hydrofluoroethers, $CO_2$, $NH_3$, $SO_2$ and fluoroolefins.

Preferably, the refrigerant is selected from hydrocarbon compounds, hydrofluorocarbons, ethers, hydrofluoroethers, halocarbons, $CO_2$, $NH_3$, $SO_2$ and fluoroolefin.

In one embodiment, the heat-transfer fluid is a refrigerant fluid selected from $CO_2$, haloalkanes, haloalkenes, fluoropropenes, fluoropropanes and fluoroethanes, preferably from among 1,3,3,3-tetrafluoropropene, 2,3,3,3-tetrafluoropropene, 1,2,3,3,3-pentafluoropropene, 1,1,3,3-tetrafluoropropene, 3,3,3-trifluoropropene, 2,3,3-trifluoropropene, 1,1,1,2-tetrafluoroethane, 1,1,2,2-tetrafluoroethane, pentafluoroethane, difluoromethane, 1,1-difluoroethane, 1,1,1,2,3,3,3-heptafluoropropane, 1,1,1-trifluoropropane, 1,1,1,3,3,3-hexafluoropropane, 1,1,1,3,3-pentafluoropropane, 1,1,1,3,3-pentafluorobutane, 1,1,1,4,4,4-hexafluorobut-2-ene, trifluoroiodomethane, 1-chloro-3,3,3-trifluoropropene, 1-chloro-2,3,3,3-tetrafluoropropene, 1-chloro-2,3,3,3-tetrafluoropropene and mixtures thereof.

In the context of the invention, "HFO-1234yf" refers to 2,3,3,3-tetrafluoropropene, "HCFO-1233zd" refers to 1-chloro-3,3,3-trifluoropropene, "HCFO-1224yd" refers to 1-chloro-2,3,3,3-tetrafluoropropene, and "HFO-1336mzz" refers to 1,1,1,4,4,4-hexafluorobut-2-ene.

In one preferred embodiment, the heat-transfer fluid is a refrigerant selected from 1,3,3,3-tetrafluoropropene (1234ze), 2,3,3,3-tetrafluoropropene (HFO-1234yf or 1234yf), difluoromethane (HFC-32); in particular, the heat-transfer fluid is 2,3,3,3-tetrafluoropropene (1234yf) and difluoromethane, alone or in a mixture.

The heat transfer fluid may be a mixture of 2,3,3,3-tetrafluoropropene (HFO-1234yf) and difluoromethane (HFC-32) in proportions ranging from 20 to 95% by weight of HFO-1234yf with respect to the total weight of the mixture, the complement to 100% being HFC-32. The transfer fluid can be one of the following mixtures HFO-1234yf/HFC-32 of 27.5/72.5; 35/65; 42.5/57.5; 45/55; 55/45; 57.5/42.5; 70/30; 78.5/21.5; 80/20 and 90/10 in weight percent with respect to the total weight of the mixture.

Advantageously, said refrigerant fluid contains a lubricant, preferably selected from mineral oils, silicone oils, natural paraffins, naphthenes, synthetic paraffins, alkylbenzenes, polyalphaolefins, polyalkylene glycols, polyol esters and/or polyvinylethers; the lubricant being in a more particularly preferred way a polyalkylene glycol or a polyol ester.

According to a characteristic of the invention, the circuit may comprise at least one secondary loop connected to the main loop, the one or more secondary loops being connected to the automotive vehicle passenger compartment and/or to an electronic circuit connected to an electric motor of the motor vehicle and/or to an internal combustion engine of the motor vehicle, when the motor vehicle is a hybrid type.

Advantageously, the circuit may comprise a control device configured for controlling the heat transfer from the main loop to the at least one secondary loop such as previously defined.

Other goals, advantages and features will emerge from the following description given as a purely illustrative example and made with reference to the attached drawings, whereupon:

FIG. 1 is a cross sectional view of a cooling and/or heating device for a battery for an electric or hybrid motor vehicle, the device comprising an inner envelope and an outer envelope.

FIG. 2 is a cross sectional view of a portion of a cooling and/or heating device for a battery for electric or hybrid automotive vehicle, the device comprising inner and outer envelopes, and where FIG. 2 shows an outer envelope configuration alternative to the outer envelope shown in FIG. 1.

FIGS. 1 to 2 show two embodiments of a cooling and/or heating device for an electric or hybrid vehicle battery conforming to the invention.

In FIG. 1, the cooling and/or heating device according to the invention 1 shown comprises two envelopes. An inner envelope 2 is arranged facing the battery 3. An outer envelope 4 forms a passage with the inner envelope 2 intended for the flow of heat transfer fluid 5. The device 1 is provided with an inlet 6 and an outlet 7 for the passage of a heat transfer fluid 5.

In the example shown, a space 8 is provided between the battery 3 and the inner envelope 2. According to an alternative, the inner envelope 2 could be arranged, at least in part, in contact with the battery so as to optimize the heat transfer between the battery 3 and the heat transfer fluid 5.

Conventionally, the battery 3 comprises a plurality of adjacent cell packs. According to another example shown in FIG. 2, the inner envelope 2 is inserted between two adjacent cell packs. FIG. 2 shows schematically a portion of the battery 3 comprising three identical cell packs 9, 10 and 11.

Reference will be made to the adjacent packs 9 and 10 each comprising four walls, respectively 9a, 9b, 9c, 9d and 10a, 10b, 10c, 10d. In the example shown, the inner envelope 2 is arranged in part facing walls 9a, 9b, 9c, 9d of pack 9 and walls 10a, 10b, 10c, 10d of pack 10.

The inner envelope 2 thus extends closest to the cell packs of battery 3 so as to follow their shape, thus allowing improvement of the heat transfer between the battery 3 and the heat transfer fluid 5 for a better energy recovery. Advantageously, such an envelope 2 adapted to the complex geometry of the battery 3 can easily and quickly be manufactured because of the polyamide composition.

Advantageously, the inner and outer envelopes can be coated with a layer having a low water permeability. The layer(s) (not shown in the figures) can be inner or outer.

Preferably, at least one layer with a low water permeability is arranged in contact with the inner envelope 2, on the inside, i.e. in contact with the heat transfer fluid 5.

The function of the heat transfer fluid 5 is to transfer the heat between two or more temperature sources. This fluid can be a gas, air or even a liquid.

FIG. 3 illustrates a circuit according to a particular embodiment of the invention. The circuit 20 comprises a device according to the invention 21 encapsulating a battery, an expansion valve 22, a heat exchanger 23, a four-way valve 24, and a compressor 25. The heat exchanger 23 is of the air/heat transfer fluid type, preferably refrigerant. The refrigerant of the circuit 20 and the air flow supplied by a fan pass through the heat exchanger 23. Some or all of this same air flow may, for example, pass through a heat exchanger of the cooling system of an internal combustion engine for a hybrid vehicle (not shown in the figure) or the passenger compartment. The direction of air flow is dependent on the operating mode of the circuit 20, the battery requirements, and the internal combustion engine requirements, for hybrid vehicles In refrigeration mode, that is when the battery generates heat, the refrigerant set in motion by the compressor 25 passes through the valve 24, then through the device 21 acting as a condenser (that is it releases heat outwardly), then through the expansion valve 22, then through the exchanger 23 acting as an evaporator, thus allowing the cooling of the flow of air intended to be pulsed inside the passenger compartment of the motor vehicle.

In heat pump mode, that is when the battery needs to be heated, for example during start-up, the refrigerant flow direction is reversed via the valve 24. The heat exchanger 23 acts as a condenser, while the device 21 acts as an evaporator. The heat exchanger 23 then makes it possible to heat the air flow intended for the passenger compartment of the motor vehicle.

The heat exchangers of the cooling circuit can be activated by means of the valves according to the needs of the internal combustion engine (heating the air entering the engine or recovering energy produced by this engine).

In addition, the vapor compression circuit may comprise different branches with separate heat exchangers, with or without refrigerant flowing through these branches, depending on the operating mode. Optionally, alternatively, or additionally, the vapor compression circuit may comprise means for changing the direction of refrigerant flow, comprising for example one or several three-way or four-way valves.

Figure 4:
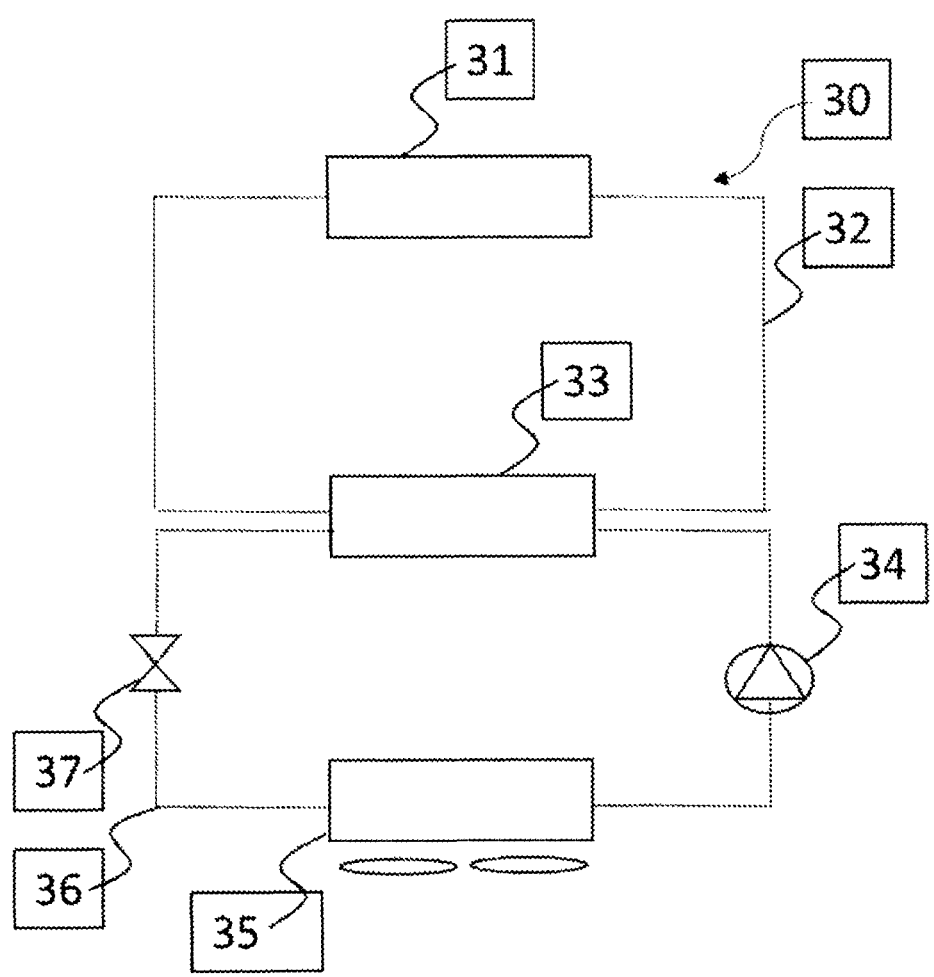
FIG. 4 shows a cooling and/or heating circuit of a battery incorporating the device according to the invention, comprising two heat transfer loops.

FIG. 4 illustrates a circuit according to another embodiment of the invention. The circuit 30 comprises two heat transfer fluid circulation loops 32 and 36, one loop 32 in which air circulates and one loop 36 in which a refrigerant circulates. The loop 32 comprises a device according to the invention 31 encapsulating a battery and a heat exchanger 33 of the air/fluid type. This loop 32 comprises an air flow to heat or cool the battery. A fan can be incorporated into this loop to circulate the air. The heat exchanger 33 is also part of the loop 36, which comprises a compressor 34, a heat exchanger 35 and an expansion valve 37. The heat exchanger 35 may be connected to the passenger compartment of the vehicle or to the thermal engine in the particular case of a hybrid vehicle.

The invention claimed is:

1. A device for use in a cooling and/or heating circuit of an electric or hybrid motor vehicle battery, comprising:
   an outer envelope consisting of a first composition comprising:
      20 to 65% by weight of reinforcing fibers which do not have heat-conducting properties, in relation to the total weight of the first composition,
      the complement of the first composition being a matrix comprising mostly at least one polyamide such that the first composition does not include any reinforcing fibers having heat-conducting properties or other thermally conductive component, and
   an inner envelope disposed opposite the battery and intended to be in contact with a cooling fluid, the inner envelope consisting of a second composition comprising:
      5 to 65% by weight of reinforcing fibers in relation to the total weight of the second composition, wherein the reinforcing fibers of the second composition are either reinforcing fibers which do not have heat-conducting properties or reinforcing fibers which have heat-conducting properties, if the reinforcing fibers of the second composition do not have heat-conducting properties, 10 to 20% by weight of at least one thermally conductive component, in relation to the total weight of the second composition, at least one flame retardant, and the complement of the second composition being a matrix comprising mostly at least one polyamide chosen from semi-aromatic polyamides and polyamides consisting of units having an average number of carbon atoms per nitrogen atom ranging from 7 to 10, a heat transfer fluid inlet; and a heat transfer fluid outlet, the device delimiting a cooling and/or heating volume of the battery.

2. The device according to claim 1, wherein the outer envelope comprises a polyamide matrix comprising at least one polyamide chosen from semi-aromatic polyamides and polyamides consisting of units having an average number of carbon atoms per nitrogen atom ranging from 9 to 18.

3. The device according to claim 1, wherein the outer envelope comprises a polyamide matrix comprising at least one polyamide selected from PA612, PA1010, PA10T, PA10T/1010, PA11, PA12, PA11/10T, PA12/10T, PA 1012, PA 618, PA 12T, PA 1010/1012, PA BACT/6T, PA BACT/10T, PA BACT/12T, PA MPMDT/6T, PA MPMDT/10T, PA MPMDT/12T, PA MXDT/6T, PA MXDT/10T, PA MXDT/12T, PA 11/BACT/6T, PA 11/BACT/10T, PA 11/BACT/12T, PA 11/MPMDT/6T, PA 11/MPMDT/10T, PA 11/MPMDT/12T, PA 11/MXDT/6T, PA 11/MXDT/10T, PA 11/MXDT/12T, and mixture thereof.

4. The device according to claim 1, wherein the inner envelope comprises a polyamide matrix comprising at least one polyamide selected from PA610, PA410, PA412, PA612, PA1010, PA6T, PA6I, PA9T, PA10T, PA6T/6I, PA6T/10T, PA6T/1010, PA10T/1010, and mixture thereof.

5. The device according to claim 1, wherein the reinforcing fibers not having heat-conducting properties are chosen from glass fibers, basalt fibers and aramid fibers.

6. The device according to claim 1, wherein the reinforcing fibers having heat-conducting properties are selected from carbon, carbon fibers, carbon black, carbon nanotubes, expanded graphite, aluminum nitride and boron nitride.

7. The device according to claim 1, wherein the ratio of the thermal conductivity ($\lambda$) of the inner envelope to the thermal conductivity ($\lambda$) of the outer envelope is at least greater than 1.5.

8. The device according to claim 1, wherein the flame retardant is a metal salt selected from a metal salt of phosphinic acid, a metal salt of diphosphinic acid, a polymer containing at least one metal salt of phosphinic acid, a polymer containing at least one metal salt of diphosphinic acid; red phosphorus, an antimony oxide, a zinc oxide, an iron oxide, a magnesium oxide, metal borates, melamine cyanurates, siliconated or fluoridated type non-drip agents, and mixture thereof.

9. The device according to claim 1, wherein when the battery comprises a plurality of adjacent cell packs, then the inner envelope encapsulates the assembly of cells by complementarity of shape.

10. The device according to claim 1, wherein the inner envelope and/or the outer envelope is/are coated on the inside and/or the outside with a layer having a low water permeability.

11. The device according to claim 1, wherein the first and second compositions are different.

12. A system for cooling and/or heating a battery of an electric or hybrid motor vehicle, the system comprising: a cooling and/or heating circuit, a refrigerant selected from the compounds that are hydrocarbons, hydrofluorocarbons, ethers, hydrofluoroethers, halocarbons, CO2, NH3, SO2 and fluoroolefins, and the device of claim 1.

13. The system of claim 12, wherein the refrigerant is selected from CO2, haloalkanes, haloalkenes, fluoropropenes, fluoropropanes and fluoroethanes, and mixtures thereof.

14. The system of claim 13, wherein the refrigerant is chosen that the heat transfer fluid is a refrigerant selected from 1,3,3,3-tetrafluoropropene (1234ze), 2,3,3,3-tetrafluoropropene (1234yf), difluoromethane, 1-chloro-3,3,3,3-tetrafluoropropene (HCFO-1233zd), 1-chloro-2,3,3,3-tetrafluoropropene (HCFO-1224 yd), and 1,1,1,4,4,4-hexafluorobut-2-ene (HFO-1336mzz).

15. The system of claim 12, wherein the refrigerant fluid contains a lubricant.

16. A cooling and/or heating circuit for an electric or hybrid motor vehicle battery, comprising a main circulation loop for a heat transfer fluid provided with means intended for the circulation of the heat transfer fluid in the main circulation loop, wherein the main circulation loop is connected to a reversible heat pump and the device as defined in claim 1.

* * * * *